United States Patent [19]

Klancnik

[11] 4,047,779

[45] Sept. 13, 1977

[54] ANTENNA COUPLINGS

[75] Inventor: John H. Klancnik, Des Plaines, Ill.

[73] Assignee: Afco Products Incorporated, Des Plaines, Ill.

[21] Appl. No.: 623,015

[22] Filed: Oct. 16, 1975

[51] Int. Cl.² ........................................... H01R 41/00
[52] U.S. Cl. ................................. 339/9 A; 343/715; 403/189
[58] Field of Search ................. 339/9 A, 9 R, 9 RY, 339/10, 76, 79, 89 R; 343/715, 713, 900; 403/189

[56] References Cited

U.S. PATENT DOCUMENTS

| 2,786,884 | 3/1957 | Chadowski et al. | 343/715 X |
| 3,003,149 | 10/1961 | Grashow | 343/715 |
| 3,682,516 | 8/1972 | Savage | 403/189 |
| 3,852,757 | 12/1974 | Kaiser | 343/713 |

Primary Examiner—Roy Lake
Assistant Examiner—DeWalden W. Jones
Attorney, Agent, or Firm—Kinzer, Plyer, Dorn & McEachran

[57] ABSTRACT

An antenna coupling enabling the antenna to be quickly detached but incorporating a lock to forestall theft.

24 Claims, 5 Drawing Figures

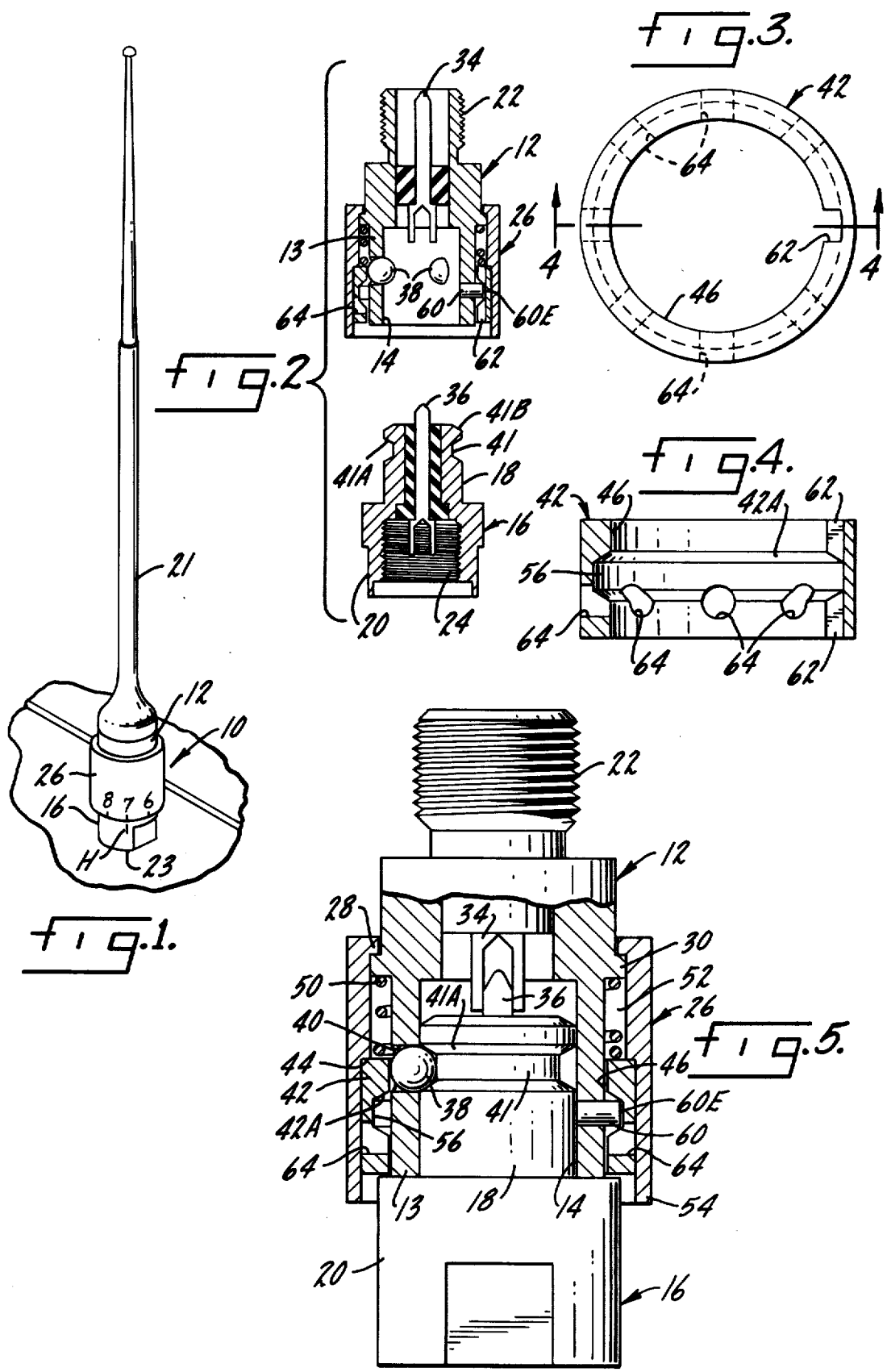

ANTENNA COUPLINGS

This invention relates to a vehicle mounted antenna and in particular in a coupling detachably mounting the antenna to the vehicle for quick detachment but yet in such a fashion as to reduce the possibility of theft.

The so-called citizen band radio ("CB") is becoming increasingly popular as an automotive accessory. The CB antenna, supported on the outside of an automobile, requires a coupling that can be easily released in order that the antenna may be removed without special tools, as when the vehicle is washed. However, this makes theft of the antenna an attractive proposition and the primary object of the present invention is to discourage theft by devising a coupling which requires knowledge of the manner in which uncoupling may be readily accomplished. Specifically it is an object of the present invention to devise an antenna coupling (detachably coupling the antenna to a vehicle) in which two principal coupling members can be readily separated only when a lock pin has been rotated to a particular position. Any person not having knowledge of the release position of the lock pin will either be completely discouraged from an attempted theft or will find himself involved in a time consumming effort to fathom the secret of detachment. No device is fool-proof because fools are too ingenious, but nonetheless a thief is ordinarily unwilling to tolerate a time lapse in which an attempted theft may be discovered, especially the impatient hit-and-run thief whose proclivities involve unattended automobiles.

Another object of the invention is to further discourage an attempted theft by confronting the thief with a maze of numerals so that even if this particular class of thieves becomes aware of the general principle of the invention they are nonetheless faced with the plain proposition of spending time to find the right combination.

Specifically it is an object of the present invention to incorporate the lock pin in a coupling having a sturdy, reliable detent normally blocked in holding position, completing the coupling, by a rotary release member having only one position where the lock pin may be released to enable the detent to be released.

In the drawing:

FIG. 1 is a prespective view of an antenna detachably coupled to a vehicle in accordance with the present invention.

FIG. 2 is an exploded, sectional view of the coupling.

FIG. 3 is a plan view, on an enlarged scale, of a retainer ring featured in the present invention.

FIG. 4 is a sectional view on the line 4—4, FIG. 3.

FIG. 5 is an elevation of the present coupling, partly in section, and on an enlarged scale compared to FIG. 2.

The coupling 10, FIG. 1, comprises an inner shell member 12 of cylindrical form having a reduced stem 13 affording an inner cavity or recess 14, FIG. 2, for receiving a stud member 16. The stud 16 has a first portion 18 insertable in the recess 14 and a second, enlarged portion 20 which extends outwardly of the recess when the two members are mated in axial alignment in the manner shown in FIG. 5. Though mated, and secured against axial displacement in the manner hereafter described, the two parts can be rotated one relative to the other.

One member, the shell for example, carries means enabling the antenna 21, FIG. 1, to be supported thereon and such means may be in the form of a reduced portion 22 which is externally threaded to threadedly receive the antenna. In like manner, the other member, the stud, carries means enabling the coupling to be attached to the vehicle mounting base 23 and such means may be in the form of an internal thread 24 formed on the extended portion 20 of the stud member.

The coupling includes an outer shell or collar 26 encircling the inner shell 12 and constituting a release means for both a detent and a lock pin hereinafter identified. To rotatably support the collar 26 on the shell 12, an inwardly directed annular lip 28 is presented at one end of the collar engageable with a complemental annular shoulder 30 at a medial part of the inner shell.

Interfitting electrical contacts 34 and 36 are supported by insulating sleeves inside the respective members.

In the coupled position, FIG. 5, a detent acting between the sleeve 12 and the stud 16 normally secures these two members against axial displacement. The detent in partly characterized by a race of balls 38 (three in all) mounted in corresponding sockets 40 in a medial part of the shell which affords the recess 14. The ball race fits a circular groove 41 formed in the inner portion 18 of the stud and constituting the other part of the detent.

The balls are normally held seated in their sockets 40 by a spring-biased retainer carried by sleeve 26, which also enables the detent to be released. The retainer is preferably in the form of a collar 42 press-fitted against a stop shoulder 44 on the inside of sleeve 26. The retainer collar has an annular inner shoulder 46 aligned to the circumference of the ball detent race in the coupled position, FIG. 5.

Spring means normally locate the retainer ring 46 in retaining position, holding the balls in locking position, FIG. 5. The spring means is in the form of a coil spring 50 positioned in an annular space 52 between the inner diameter of collar 26 and the outer diameter of stem 13 of sleeve 12. The ends of the spring are captured by and therefore react respectively on shoulder 30 and collar 42, whereby in effect the spring 22 urges collar 26 to retaining position defined by engagement of shoulder 28 with shoulder 30, FIG. 5.

The collar 26 has a skirt 54 affording a weather seal and dust protector extending about the exterior of stud 16 as shown in FIG. 5.

As noted above, stud member 16 has an internal thread 24 enabling the coupling unit as a whole to be attached to the base mount on the vehicle. Also, the external thread 22 on the sleeve member 12 is for the purpose of enabling the antenna to be attached thereto.

Ordinarily a coupling 10 of the form as far described may be released to uncouple the two members 12 and 16 by pulling or pushing collar 26 upwardly as viewed in FIG. 5 against the bias of spring 50. Such relative axial movement (if permitted in the manner to be explained) presents an annular detent release groove 56 to the detent balls 38, whereupon stud member 16 may be withdrawn axially downward (while holding the collar in its detent release position against the return force of the spring) since the balls 38 are free to move radially outward into the release groove 56, uncoupling the parts which is the relationship shown in FIG. 2. In this connection it will be noted that groove 41 in the stud member has an annular camming surface 41A, FIG. 5, for camming the balls 38 radially outward during uncoupling movement.

To recouple the parts, sleeve 26, FIG. 2, is again pushed or pulled upwardly against the return action of spring 50 to align the relase groove 56 with the balls 38. The sleeve 26 is held while the stud member is inserted into recess 14. A camming surface 41B, FIG. 2, at the head of the stud forces the balls radially outward into release groove 56 to enable the stud member to be fully seated, whereupon sleeve 26 may be released so that the spring expands to re-present the retainer shoulder 46 to the ball race, holding the ball detents in the retainer groove 41 of the stud. Retainer shoulder 42, as shown in FIG. 5, has a cam surface 42A to enable the retainer 42 to be slid downwardly past detent balls 38 in the course of recoupling the parts.

In accordance with the present invention a lock pin is fitted to one of the members to prevent uncoupling in the foregoing manner except by a person who is cognizant of the manner in which the lock pin is to be turned to permit disassembly as an incident to removing the member which carries the antenna. This is achieved by press-fitting a lock pin 60 radially in the inner sleeve 12, with the projecting end 60E, FIG. 2, thereof alignable with an escape slot 62 formed in retainer 42. Slot 62 is located on the inner circumference of the retainer collar or ring 42. The slot 62 opens into release groove 56 and is broached to open at the end of retainer 42 opposite the shoulder 44.

Spring 50 normally biases sleeve 26 so that the cam surface 42A of release groove 56 is normally presented to pin 60. Slot 62 occupies a limited, definite position so that it is necessary to rotate the members to hunt for the alignment between the lock pin and escape slot; only then is it possible to uncouple the members. Thus, as shown in FIG. 2, where the members are separated, the free or projecting end 60E of pin 60 is disposed in slot 62 (allowing the members to be separated) and it is therefore possible to move sleeve 26 upward incidental to reinserting stud 16 in the inner sleeve 12. By the same token, it is possible to uncouple the members only when sleeve 26 is rotated to a position where broached slot 62 is aligned with the pin 60.

When re-coupled, sleeve 26 is rotated, or shell 12 is rotated, to displace the pin from the escape slot.

To obscure the action of the lock pin, false openings 64 are formed about groove 56. The end 60E of the pin 60 may fit therein but these holes are mere stops impermissive of escape of the lock pin.

To prevent hunting for the escape slot by the knowledgeable person, the skirt 54 of collar 26 and the external portion of stud 16 may be scribed with index marks to indicate when slot 62 is aligned with the lock pin 60. Such scribe marks may be nothing more than hair-line scribes, one at the edge of the skirt 54 and one in aligned position on the stud 16. However, the better index is a hair line scribe mark H, FIG. 1, on the stud 16 and numerals on the skirt 54 as shown in FIG. 1, one of which identifies the slot 62, known to the owner. Therefore, even if the principle should become general knowledge among thieves the thief knows he's got to spend time hunting for the right combination, which is a deterent.

It will be seen that under the present invention the shell and stud members are respectively adapted to be attached to the antenna and the base mount of the vehicle. A detent normally couples the two members but they may be readily separated by rotating the release member to a position where it presents an escape slot to the member having the lock pin. More specifically, the release member has a groove as 56 in which the pin normally reposes and only when the escape slot 62, communicating with the groove, is aligned with the pin can the parts be separated to detach the antenna at the same time. No special tools are necessary to detach the antenna itself.

The release member also normally blocks the detent in holding position. The detent is released only when the pin is released since only at that time is it possible to displace the release member 26 axially compared to the shell member, thereby to allow the detent (ball race) to be cammed into groove 56 upon axial displacement of the stud member relative to recess 14. Certain elements can of course be reversed.

I claim:
1. A coupling for a vehicle-mounted antenna for coupling the antenna to a base mount attached to a part of the vehicle while permitting detachment of the antenna and comprising:
   a shell member having an internal recess;
   a stud member having a first portion disposed in said recess and a second portion extending axially thereof;
   said members being relatively moveable and respectively having means carried thereby enabling the coupling to be attached to the base mount and enabling the antenna to be attached to the coupling;
   one of said members having a lock pin fixed thereto separably securing the members;
   a release member carried by the member not having the pin, said release member having a surface presenting a plurality of openings for receiving the pin, each opening including a stop means preventing the separation of the shell and stud members when the pin is aligned therein;
   and said release member having a slot therein which, when the pin is aligned therewith, is permissive of the separable members being separated along with the antenna carried by one of the separated members, whereby knowledge of the location of the slot allows quick separation but lack of knowledge requires hunting for the slot.

2. A coupling according to claim 1 in which the shell and stud members are relatively rotatable, said pin extending radially, and said openings being circumferentially spaced.

3. A coupling according to claim 2 in which the shell and stud members are normally held coupled by a detent acting therebetween, a detent release carried by said release member, and spring means normally biasing the release member to a detent holding position.

4. A coupling according to claim 3 in which the detent is a ball and groove detent.

5. A coupling according to claim 4 in which the release member is a collar surrounding the shell member, said spring means being a coil spring having one end acting on the shell and another end acting on the collar.

6. A coupling according to claim 5 in which the stud member and collar are scribed with marks identifying the position where the pin is aligned with the slot.

7. A coupling according to claim 1 in which the stud member and release member are scribed with marks identifying the position where the pin is aligned with the slot.

8. A coupling according to claim 7 in which the stud and shell members are relatively rotatable, said pin extending radially, and said openings being circumferentially spaced.

9. A coupling according to claim 8 in which the stud and shell members are normally held coupled by a detent, and a detent release means carried by said release member.

10. A coupling according to claim 9 in which the detent is a ball and groove detent.

11. A coupling according to claim 10 in which the members respectively carry interfitting electrical contacts.

12. A coupling for a vehicle-mounted antenna for coupling the antenna to a base mount attached to a part of the vehicle while permitting detachment of the antenna and comprising:
a shell member having an internal recess;
a stud member having a first portion disposed in said recess and a second portion extending axially thereof;
said members being relatively moveable and respectively having means carried thereby enabling the coupling to be attached to the base mount and enabling the antenna to be attached to the coupling;
one of said members having a radially extending lock pin fixed thereto separably joining the members;
a rotatable release member surrounding the other two members and having a circumferential groove in which the pin normally resides,
said release member also having a plurality of openings spaced about the groove for receiving the pin, each opening including a stop means preventing the separation of the stud and shell members when the pin is aligned therein;
said release member having an axial slot therein which, when the pin is aligned therewith, is permissive of the shell and stud members being separated along with the antenna carried by one of the separated members, whereby knowledge of the location of the slot allows quick separation but lack of knowledge requires hunting for the slot; and
spring means biasing the release member normally to a position where the groove is aligned with the pin.

13. A coupling according to claim 12 in which the lock pin is carried by the shell member.

14. A coupling according to claim 12 in which the release member and the member having the pin are scribed with marks identifying the position where the pin and escape slot are aligned.

15. A coupling for a vehicle-mounted antenna for coupling the antenna to a base mount attached to a part of the vehicle while permitting detachment of the antenna and comprising:
a shell member having an internal recess;
a stud member having a first portion disposed in said recess and a second portion extending axially thereof;
said members being relatively moveable and respectively having means carried thereby enabling the coupling to be attached to the base mount and enabling the antenna to be attached to the coupling;
one of said members having a lock pin fixed thereto separably joining the members; and
a release member having a slot therein which, when the pin is aligned therewith, is permissive of the shell and stud members being separated along with the antenna carried by one of the separated members, whereby knowledge of the location of the slot allows quick separation but lack of knowledge requires hunting for the slot.

16. A coupling according to claim 15 wherein the release member surrounds the other two members and has a circumferential groove in which the pin normally resides.

17. A coupling according to claim 16 including spring means normally biasing the release member to a position where the groove is aligned with the pin.

18. A coupling according to claim 17 in which the shell and stud members are relatively rotatable, said pin extending radially, and said openings being circumferentially spaced.

19. A coupling according to claim 18 in which the shell and stud members are normally held coupled by a detent acting therebetween, a detent release carried by said release member, and spring means normally biasing the release member to a detent holding position.

20. A coupling according to claim 19 in which the detent is a ball and groove detent.

21. A coupling according to claim 20 in which the release member is a collar surrounding the shell member, said spring means being a coil spring having one end acting on the shell and another end acting on the collar.

22. A coupling according to claim 16 in which the stud member and release member are scribed with marks identifying the position where the pin is aligned with the slot.

23. A coupling according to claim 22 in which the release member includes a skirt portion overlapping a portion of the stud member to afford a weather seal.

24. A coupling according to claim 22 in which the marks include numerals.

* * * * *